United States Patent
Lee et al.

(10) Patent No.: US 12,370,559 B2
(45) Date of Patent: Jul. 29, 2025

(54) AIR PURIFYING FILTER

(71) Applicant: LG ELECTRONICS INC., Seoul (KR)

(72) Inventors: Jung Ryun Lee, Seoul (KR); Seung Jae Baeck, Seoul (KR); Ok Chun Hyun, Seoul (KR); Hyung Ho Park, Seoul (KR); Yang Hwa Lee, Seoul (KR); Chi Young Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 512 days.

(21) Appl. No.: 17/776,720

(22) PCT Filed: Nov. 17, 2020

(86) PCT No.: PCT/KR2020/016185
§ 371 (c)(1),
(2) Date: May 13, 2022

(87) PCT Pub. No.: WO2021/101215
PCT Pub. Date: May 27, 2021

(65) Prior Publication Data
US 2022/0379319 A1    Dec. 1, 2022

(30) Foreign Application Priority Data
Nov. 18, 2019    (KR) .................. 10-2019-0148117

(51) Int. Cl.
*B01D 46/00*    (2022.01)
*B01D 46/52*    (2006.01)
(Continued)

(52) U.S. Cl.
CPC .......... *B03C 3/155* (2013.01); *B01D 46/0032* (2013.01); *B01D 46/521* (2013.01);
(Continued)

(58) Field of Classification Search
CPC ......... B03C 3/0175; B03C 3/155; B03C 3/45; B03C 3/47; B03C 3/60; B03C 3/70;
(Continued)

(56) References Cited

U.S. PATENT DOCUMENTS

| 5,549,735 A | 8/1996 | Coppom |
| 6,245,126 B1 | 6/2001 | Feldman et al. |
| 7,452,410 B2 * | 11/2008 | Bergeron .................. B03C 3/70 96/99 |

FOREIGN PATENT DOCUMENTS

| CN | 2031307 | 1/1989 | |
| CN | 101489684 B * | 7/2012 | ............... B03C 3/09 |

(Continued)

OTHER PUBLICATIONS

China Patent and Translation (Year: 2012).*

(Continued)

*Primary Examiner* — Sharon Pregler
(74) *Attorney, Agent, or Firm* — KED & ASSOCIATES, LLP

(57) ABSTRACT

Proposed is an air purifying filter. The air purifying filter includes a filtering layer (30) configured as a dielectric which collects minute particles, a first electrode layer (50) laminated on a side of the filtering layer (30) and comprising insulated wires (51) to which power is able to be applied, and a second electrode layer (70) laminated on a side of the filtering layer (30) opposite to the side of the first electrode layer and comprising a conductive material such that a polarity opposite to a polarity of the first electrode layer (50) is applied to the second electrode layer or the second electrode layer is grounded.

19 Claims, 9 Drawing Sheets

(51) Int. Cl.
  *B03C 3/155* (2006.01)
  *B03C 3/45* (2006.01)
  *B03C 3/70* (2006.01)
  *B32B 3/28* (2006.01)
  *B32B 5/02* (2006.01)
  *B32B 15/02* (2006.01)

(52) U.S. Cl.
  CPC .................. *B03C 3/45* (2013.01); *B03C 3/70* (2013.01); *B32B 3/28* (2013.01); *B32B 5/024* (2013.01); *B32B 5/026* (2013.01); *B32B 15/02* (2013.01); *B32B 2250/03* (2013.01); *B32B 2250/44* (2013.01); *B32B 2255/02* (2013.01); *B32B 2255/20* (2013.01); *B32B 2255/205* (2013.01); *B32B 2307/202* (2013.01); *B32B 2307/204* (2013.01); *B32B 2307/206* (2013.01); *B32B 2307/724* (2013.01)

(58) Field of Classification Search
  CPC ........ B01D 39/00; B01D 46/00; B01D 46/52; B01D 39/083; B01D 46/0032; B01D 46/521
  USPC ............. 95/63, 78; 96/55, 59, 66, 68, 77, 99
  See application file for complete search history.

(56) References Cited

FOREIGN PATENT DOCUMENTS

| | | |
|---|---|---|
| CN | 102847406 | 1/2013 |
| CN | 104174496 | 12/2014 |
| CN | 105849473 | 8/2016 |
| JP | 2009-165974 | 7/2009 |
| JP | 2014-133200 | 7/2014 |
| KR | 10-2004-0075448 | 8/2004 |
| KR | 10-2005-0004638 | 1/2005 |
| KR | 10-2011-0128465 | 11/2011 |
| KR | 10-2012-0126628 | 11/2012 |
| KR | 10-2012-0136795 | 12/2012 |
| KR | 10-2013-0125040 | 11/2013 |
| KR | 10-1485376 | 1/2015 |
| WO | WO 2019/167744 | 9/2019 |

OTHER PUBLICATIONS

Chinese Office Action dated Feb. 18, 2023 issued in CN Application No. 202080079415.6.
Korean Office Action dated Feb. 24, 2022 issued in KR Application No. 10-2019-0148117.
Extended European Search Report dated Nov. 20, 2023 issued in Application No. 20891242.8.
International Search Report dated Mar. 3, 2021 issued in Application No. PCT/KR2020/016185.
Korean Office Action dated Jul. 28, 2022 issued in KR Application No. 10-2022-0063747.

* cited by examiner

AIR PURIFYING FILTER

CROSS-REFERENCE TO RELATED PATENT APPLICATIONS

This application is a U.S. National Stage Application under 35 U.S.C. § 371 of PCT Application No. PCT/KR2020/016185, filed Nov. 17, 2020, which claims priority to Korean Patent Application No. 10-2019-0148117, filed Nov. 18, 2019, whose entire disclosures are hereby incorporated by reference.

TECHNICAL FIELD

The present disclosure relates generally to an air purifying filter. More particularly, the present disclosure relates to an air purifying filter in which electrostatic force is activated by applying high voltage to the filter.

BACKGROUND ART

An air purifier is understood as a device that sucks in and purifies polluted air, and then discharges the purified air. For example, an air purifier may include a blower which introduces external air into the air purifier, and filters which can filter out dust and bacteria in the air.

Among these filters, a dielectric filter is electrostatically treated during manufacturing so as to have electrostatic property. The filter treated electrostatically in this manner can electrically adsorb minute particles and thus can have a lower pressure loss and higher collection efficiency than a conventional mechanical filter.

In general, particles suspended in air contain a lot of positively or negatively charged particles, and the charged particles are strongly adsorbed to a dielectric filter which is electrostatically treated, so the collection efficiency of the filter is increased.

However, as the usage time of the filter is accumulated and the collected dust increases, the loss of electrostatic force occurs, and the collection efficiency of the filter also decreases. Accordingly, even if a filter is electrostatically treated, the filter has limited collection efficiency due to increase in usage time thereof.

Particularly, indoor air may contain multiple oil particles, and a general air purifier has a problem in that the air purifier is difficult to effectively remove oil particles contained in air. When oil particles are collected in a filter installed to remove foreign matter, an electrostatic property of the filter is rapidly reduced and the life of the filter is rapidly reduced.

In order to solve this, a filter may be used in which a power supply is connected to the filter, and an electrostatic field generated by a voltage differential between two electrodes is used. In this case, a dielectric filter is located in the electrostatic field between the two electrodes and performs a collection function.

Among prior arts, there is a prior art (Korean Patent Application Publication No. 10-2011-0128465) in which electrostatic property is given to a dielectric filter by using a porous electrode, and a porous non-woven fiber electrode having a large area is coated with a conductive material and then is insulated, thereby complicating processing of a filter and causing high manufacturing cost thereof.

Additionally, an insulating material treated on the porous non-woven fiber electrode blocks pores to increase an air pressure differential, and the increase of the air pressure differential leads to performance deterioration of the filter.

In addition, since the electrode made of a non-woven fabric is easily crumpled by external force, it is difficult to maintain and manage the shape of the electrode, and when crumpled, a coated insulating layer may be destroyed. When the porous electrode is not securely insulated, during the use of the porous electrode, current flows between the porous electrode and another electrode, so the filter may lose its electrostatic property.

Additionally, fabric structures constituting the electrode are arranged irregularly, so it is difficult to evenly form an electrostatic field in the entirety of a filter, and even in a case in which the porous electrode is not evenly coated with the conductive material, an electrostatic field is not formed evenly, so the quality of a filter deteriorates.

DISCLOSURE

Technical Problem

The present disclosure has been made to solve the above problems occurring in the prior art, and the present disclosure is intended to propose an air purifying filter in which a porous electrode surface is made by weaving pre-insulated wires and support lines.

The present disclosure is further intended to propose an air purifying filter in which the porous electrode surface is as flexible as general fibers and insulation breakdown thereof does not occur even if the porous electrode surface is crumpled.

The present disclosure is still further intended to propose an air purifying filter in which an insulated section is provided on the porous electrode surface so as to prevent a current flow between porous electrode surfaces having different polarities.

The present disclosure is still further intended to evenly distribute an electrostatic field formed by the porous electrode surface made by weaving insulated wires and the support lines to each other.

Technical Solution

In order to accomplish the above objectives, according to an aspect of the present disclosure, an air purifying filter of the present disclosure includes: a filtering layer configured as a dielectric which collects minute particles; a first electrode layer laminated on a side of the filtering layer and including insulated wires to which power is able to be applied; and a second electrode layer laminated on a side of the filtering layer opposite to the side of the first electrode layer and including a conductive material such that a polarity opposite to a polarity of the first electrode layer is applied to the second electrode layer or the second electrode layer is grounded. Accordingly, the electrode layer may be made by interlacing multiple strands of insulated wires, and as the insulated wires, wires such as enameled copper wires which are completely pre-insulated may be used, so the insulation performance of the filter may be improved, and without need for an additional insulation work, the manufacturing of the filter may be facilitated.

In addition, the first electrode layer may be configured by interlacing multiple strands of insulated wires and multiple strands of support lines which are insulators, and a surface of the first electrode layer may be insulated, and a core wire thereof may be made to be flexible in such a manner that an insulated wire which is electrically conductive and a support line which is an insulator are interlaced together to extend in different directions from each other. Accordingly, the electrode layer may be flexible like a kind of a fabric material and each of thin flexible insulated wires may be insulated, so even if the electrode layer is crumpled, the risk of insulation breakdown thereof may be very low.

The first electrode layer may be configured by weaving insulated wires and support lines, and the first electrode layer may be made by weaving the insulated wires and the support lines such that the insulated wires and the support lines constitute weft and warp yarns, respectively. Accordingly, when a fabric manufacturing device is used, the insulated wires and the support lines may be made to be weft and warp yarns, respectively, constituting the electrode layer made of a fabric material, the manufacturing of the filter may be fast and easy.

In this case, in the first electrode layer, the support lines may constitute weft and warp yarns, and the insulated wires may constitute a portion of weft or warp yarns, together with the support lines. That is, when the number of the strands of the insulated wires constituting the electrode layer is controlled, electrostatic force generated by the filter may be changed, so the filter may be easily modified according to the characteristic and use of a device to which the filter is applied.

The second electrode layer may be made of a fabric material whose surface is coated with carbon or metal. In this case, the manufacturing costs of the filter may be reduced, compared to when two electrode layers are made of insulated wires.

In addition, an insulated section in which a conductive material is omitted is formed on an edge of at least any one of the first electrode layer and the second electrode layer. Accordingly, the insulated section may be provided without a need for an additional insulation work, so insulation may be realized between the pair of electrode layers.

Furthermore, a conductive member may be connected to at least any one of opposite end parts of the first electrode layer along an edge of the first electrode layer, wherein the conductive member may be connected to an end of each of multiple insulated wires constituting the first electrode layer in a direction crossing the end so as to allow current to flow to the multiple insulated wires. Accordingly, power may be supplied simultaneously to the multiple strands of insulated wires, and the filter may realize an even performance.

Advantageous Effects

An air purifying filter of the present disclosure described above may have the following effects.

In the air purifying filter of the present disclosure, the pair of electrode layers which is conductive may be superimposed respectively on the opposite sides of the filtering layer which is a dielectric, and when power is applied therebetween and an electric field is formed therebetween, the collection performance of the filtering layer may be improved through dielectric polarization. In this case, the electrode layer may be made by interlacing the multiple strands of insulated wires, and as the insulated wires, wires such as enameled copper wires which are completely pre-insulated may be used, thereby improving the insulation performance of the filter and facilitating the manufacturing of the filter without need for an additional insulation work.

In addition, in the air purifying filter of the present disclosure, the electrode layer may be made by interlacing the insulated wires whose surface is insulated and the support lines which are insulators. Accordingly, the electrode layer may be flexible like a kind of fabric material, and each of thin flexible insulated wires may be pre-insulated, so even if the electrode layer is crumpled, insulation breakdown thereof may not occur. Accordingly, since the electrode layer has no risk of insulation breakdown, the durability of the filter may be improved, and since the filter can be folded into various shapes to be used, the degree of freedom in designing the filter may be high.

Furthermore, the electrode layer of the present disclosure may be made by weaving the insulated wires and the support lines. When a fabric manufacturing device is used, the insulated wires and the support lines may be made to be weft and warp yarns, respectively, constituting the electrode layer made of a fabric material, and accordingly, the manufacturing of the filter may be fast and easy, thereby improving productivity thereof.

Particularly, when the number of the strands of insulated wires constituting the electrode layer is controlled, electrostatic force generated by the filter may be changed, thereby enabling the filter to be easily modified according to the characteristics, use, and manufacturing cost of a device to which the filter is applied, and improving compatibility of the filter.

In addition, in the present disclosure, an insulated section in which the conductive material is omitted may be located on an edge of at least any one of the pair of electrode layers, and may be an insulation distance between the pair of electrode layers. The insulated section may be provided without a need for an additional insulation work, and thus insulation may be realized between the pair of electrode layers, thereby facilitating the insulation work of the filter and improving insulation thereof.

Accordingly, when the insulation of the filter is improved, a relatively large voltage may be applied to the electrode layer, and a filtering performance of the filtering layer may be improved, so even if fine dust particles are continuously attached and accumulated inside the filter, the activity of electrostatic force of the filter may be maintained to be constant. Furthermore, relative to the same efficiency of removing fine dust particles, the filter of the present disclosure may significantly reduce pressure loss, which is an air resistance characteristic, compared to an existing filter.

In addition, in the present disclosure, the electrode layer may be made by weaving the insulated wires and the support lines, and thus an electrostatic field formed in an electrode surface may be evenly distributed. Accordingly, there is little variation in an electrostatic field between sections of the filter, and the filter may realize an even performance, thereby increasing operational reliability of the filter.

Furthermore, the electrode layer of the present disclosure may be made like a kind of fabric by weaving the insulated wires and the support lines, so through the regular arrangement of fabrics, the electrode layer may be maintained to have predetermined thickness and be insulated in the entirety of the electrode layer, may have a very low air pressure differential depending on a location thereof, may maintain a shape thereof, and processing thereof may be facilitated.

Additionally, in the present disclosure, one of the pair of electrode layers may be made by weaving the insulated wires, and a remaining one thereof may be made by carbon coating. In this case, it is possible to reduce the manufacturing costs of the filter, compared to when two electrode layers are made of insulated wires, and it is possible to activate a sufficient electrostatic force.

In addition, in the present disclosure, a conductive member may be connected to at least a portion of the pair of electrode layers, and may be connected to the end of each of the multiple insulated wires in a direction crossing the end so as to allow current to flow to the multiple insulated wires. Accordingly, it is possible to simultaneously supply power to multiple strands of insulated wires and to realize the even performance of the filter.

MODE FOR INVENTION

Figure 1:
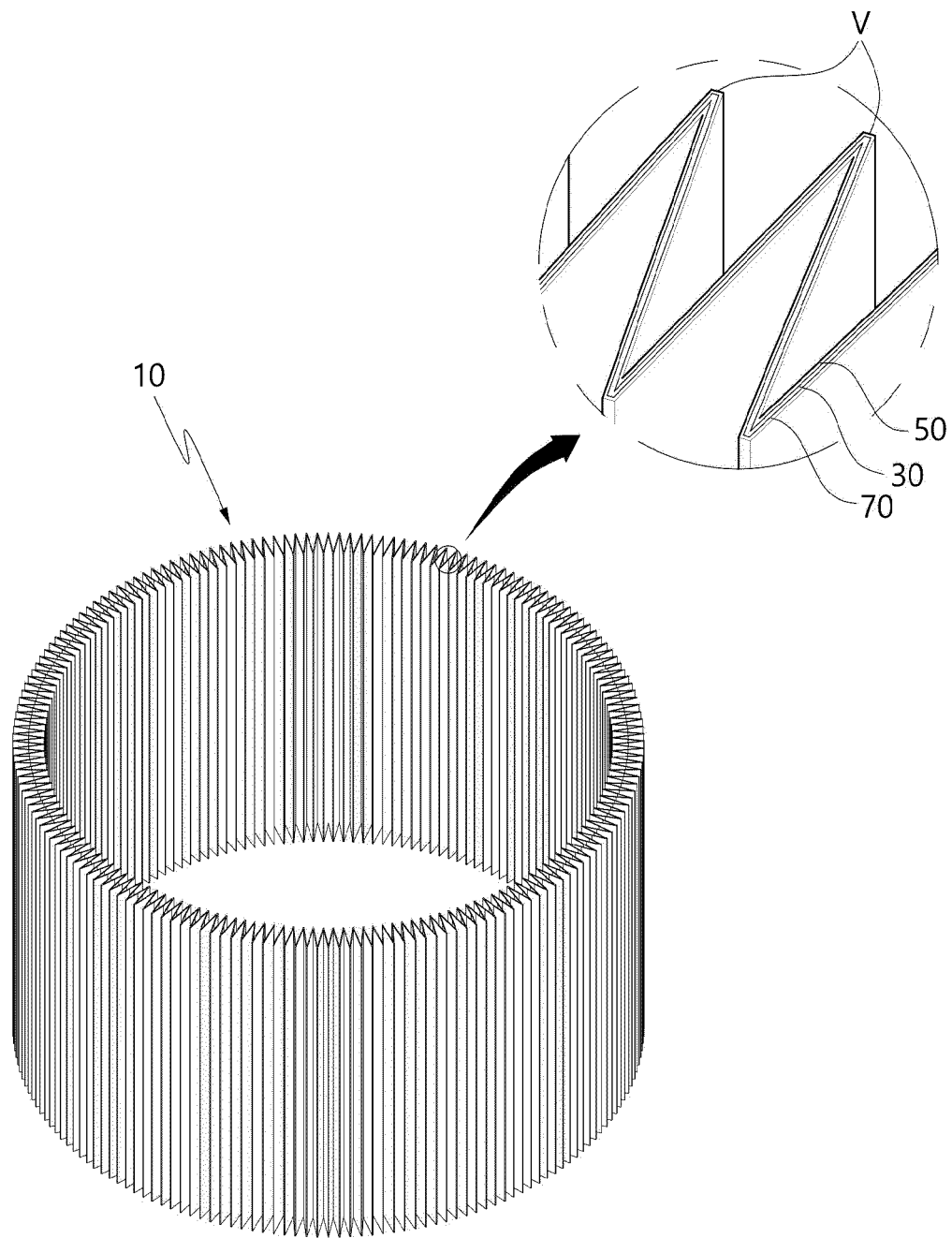
FIG. 1 is a perspective view illustrating an air purifying filter of the present disclosure made in a cylindrical shape.

Hereinbelow, embodiments of the present disclosure will be described in detail with reference to exemplary drawings. In giving reference numerals to components in each drawing, it should be noted that the same components are given the same reference numerals as much as possible although they are illustrated in different drawings. In addition, in describing the embodiments of the present disclosure, when it is determined that a detailed description of a related known configuration or function interferes with the understanding of the embodiments of the present disclosure, a detailed description thereof will be omitted.

In addition, in describing components according to the embodiments of the present disclosure, terms such as first, second, A, B, (a), and (b) may be used. These terms are only for distinguishing the components from other components, and the nature or order of the components is not limited by the terms. When a component is described as being "connected" or "coupled" to another component, the component may be directly connected to or coupled to the another component, but it should be understood that still another component may be "connected" or "coupled" thereto between each component.

The present disclosure relates to an air purifying filter 10, and more particularly, relates to an air purifying filter which can more effectively collect dust by polarizing a portion of the filter by electrostatic induction generated when power is supplied to the filter. That is, the air purifying filter of the present disclosure may collect fine dust by using static electricity, and may perform sufficient collection performance while maintaining electrostatic force when power is supplied to the filter. To this end, the air purifying filter of the present disclosure may be provided with an electrode layer to which power can be applied.

For reference, the air purifying filter 10 of the present disclosure may be used for various devices such as an air purifier, an air conditioner, and a fan, and the air purifier may be used for various purposes, such as a home air purifier or an automobile air purifier. Hereinafter, a filter used in a general home air purifier will be described as an example.

Referring to FIG. 1, a cylindrical filter 10 is illustrated. The cylindrical filter 10 may be made by rolling a thin plate-shaped filter base material, and a state in which the filter is unfolded can be seen in FIG. 2. Accordingly, the filter 10 is a thin and flexible material, and thus may be used in various shapes.

Figure 2:
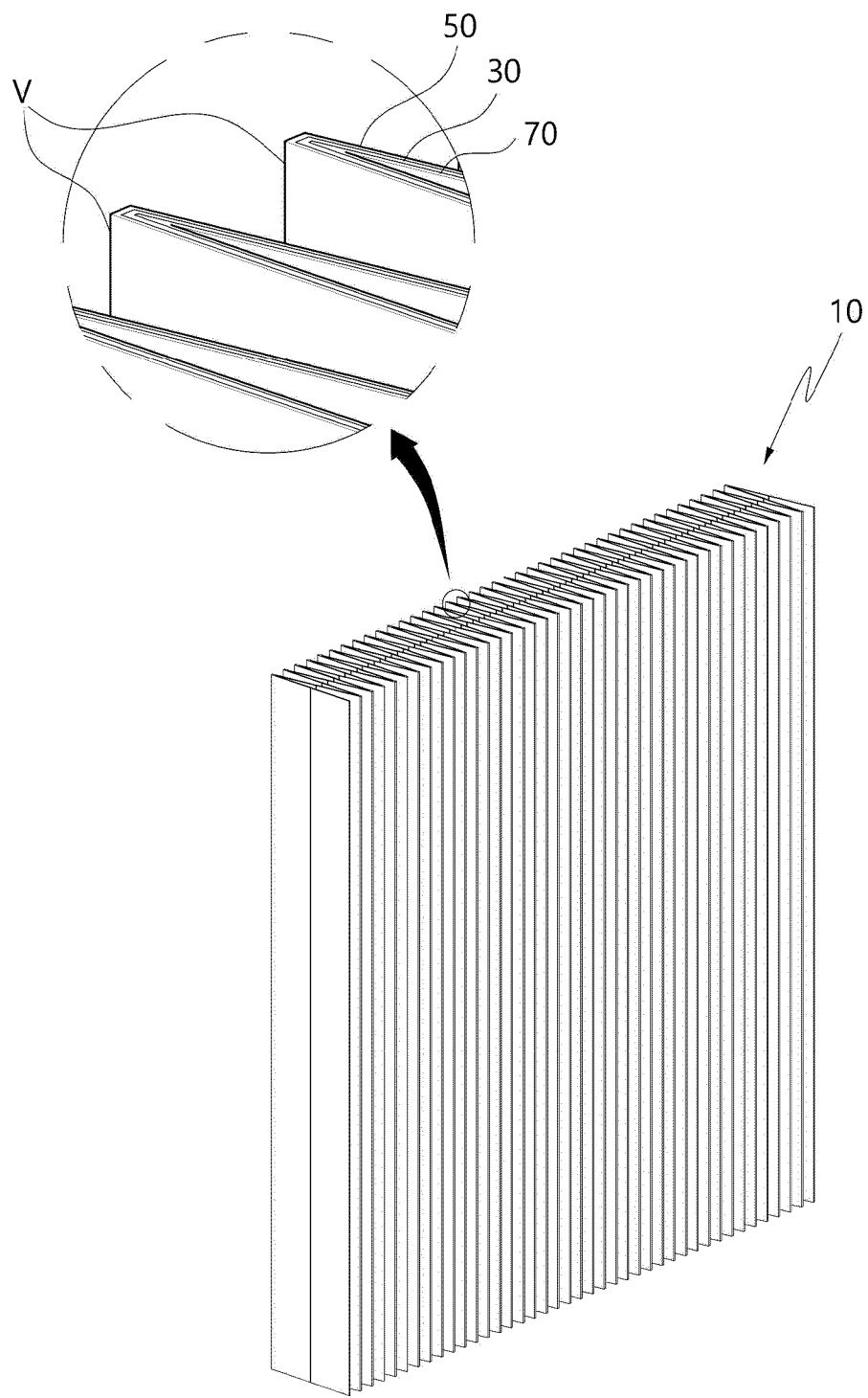
FIG. 2 is a perspective view illustrating the air purifying filter of the present disclosure made in a plate shape.

The air purifying filter 10 may have a pleated shape, and such a pleated shape may function to increase the surface area of the air purifying filter 10 so as to increase dust collection efficiency. In FIGS. 1 and 2, the air purifying filter 10 has a pleated shape, and alternatively, the air purifying filter 10 may be made without pleats.

As illustrated in the enlarged views of FIGS. 1 and 2, the air purifying filter 10 of the embodiment may be composed of three layers. Three-layered base materials may be laminated on each other and may be used as one part. Each of these three-layered base materials may be made of a thin material like a kind of fabric, and thus the entire thickness of the three-layered base materials may be thin. Accordingly, the air purifying filter may be flexible and may be changed into various shapes as illustrated in FIGS. 1 and 2 and may have even a pleated shape.

Figure 3:
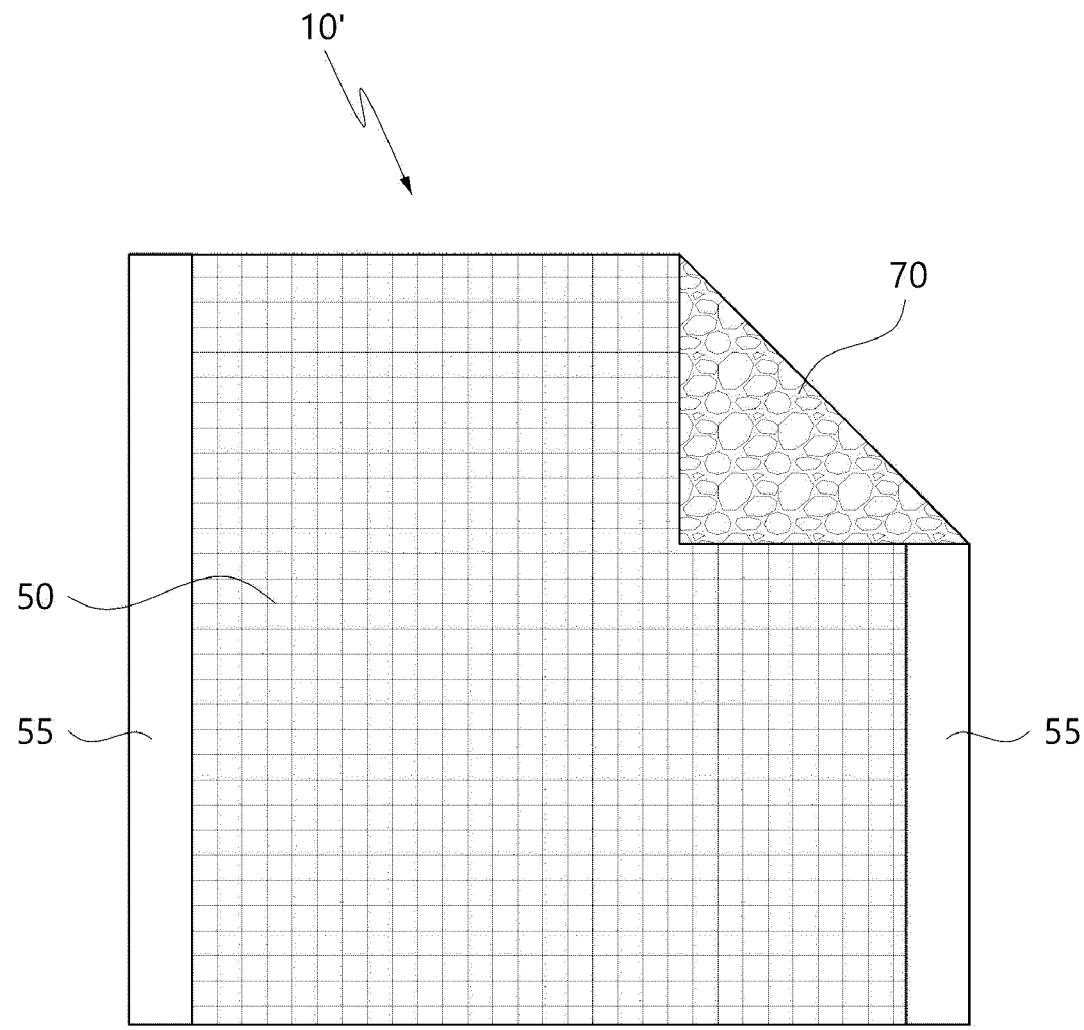
FIG. 3 is a top plan view illustrating an embodiment of the air purifying filter of the present disclosure.

Referring to FIG. 3, the air purifying filter 10 of the present disclosure is illustrated to be unfolded. As illustrated in FIG. 3, in such an air purifying filter 10, pleats may be formed on the air purifying filter 10 having a planar structure, and the air purifying filter may be rolled in a cylindrical shape (an example of FIG. 1) or may be extended long in one direction (an example of FIG. 2) to be used. For reference, in FIG. 3, a portion of a second electrode layer 70 constituting the air purifying filter 10 is illustrated to be folded.

Figure 4:
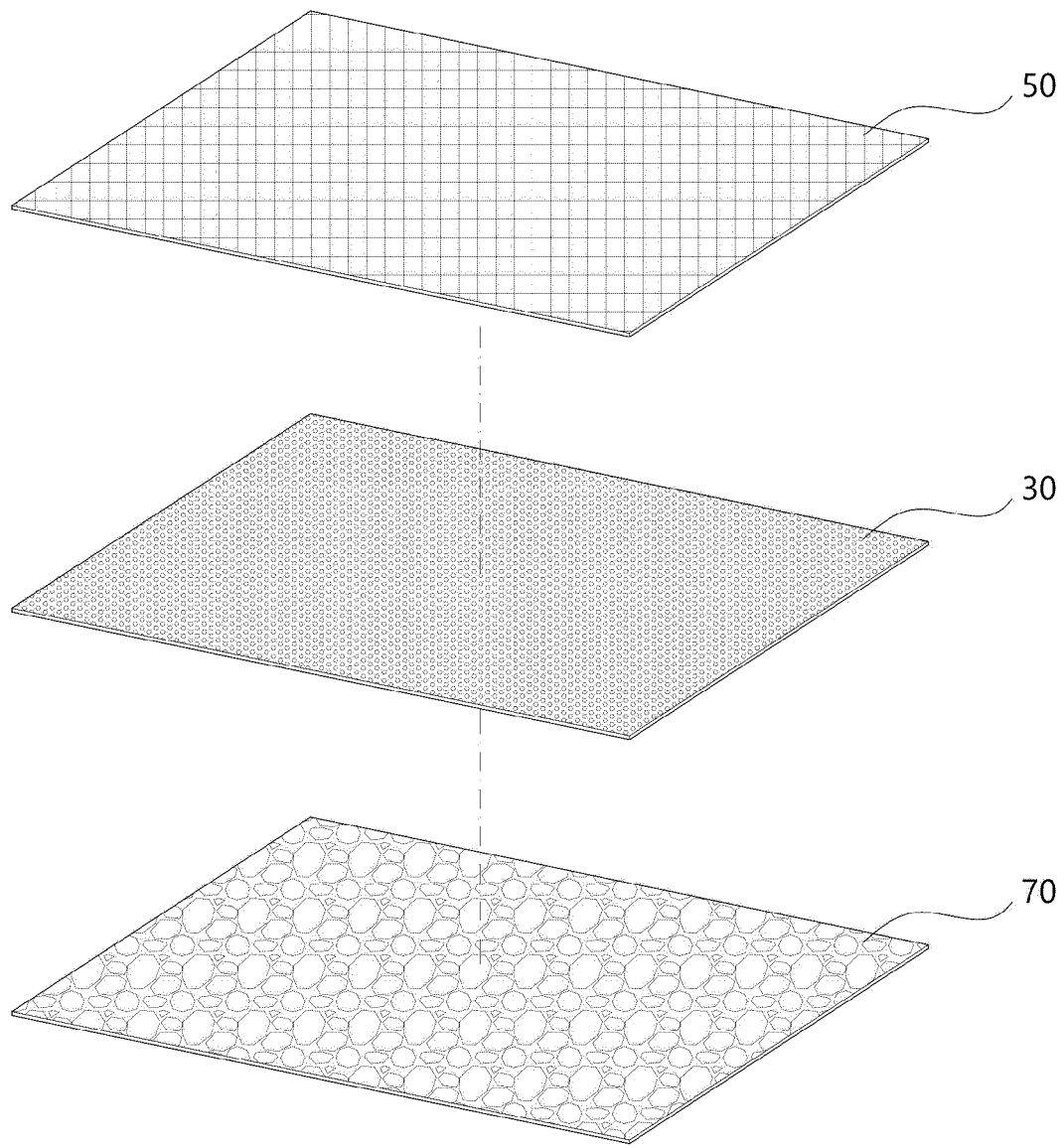
FIG. 4 is a perspective view illustrated by disassembling materials constituting the air purifying filter of the present disclosure according to the embodiment.

As illustrated in FIG. 4, the air purifying filter 10 may be composed of three layers, and a filtering layer 30 which collects and filters minute particles may be located in the center of the three layers, and a pair of electrode layers is superimposed on the opposite sides of the filtering layer 30, respectively. Accordingly, the three base materials may be bonded on each other while being laminated on each other, or may be maintained to be coupled to each other by various methods, such as laser welding, etc.

With the filtering layer 30 placed between the pair of electrode layers, the pair of electrode layers coupled to the opposite sides of the filtering layer 30, respectively, may be composed of the first electrode layer 50 and the second electrode layer 70. Power may be applied to at least any one of the first electrode layer 50 and the second electrode layer 70, and power of opposite polarity may be applied to the remaining one of the first electrode layer 50 and the second electrode layer 70 or the remaining one may be grounded, so polarization may be generated through an electric field in the filtering layer 30 located between the first electrode layer 50 and the second electrode layer 70. To this end, although not shown, a power supply part may be connected to at least any one of the first electrode layer 50 and the second electrode layer 70.

Here, the power supply part may be provided in an air purifier. For example, when the air purifying filter 10 is installed in the air purifier, the first electrode layer 50 or the second electrode layer 70 may be naturally connected to the power supply part. This will be described again below.

Figure 5A:
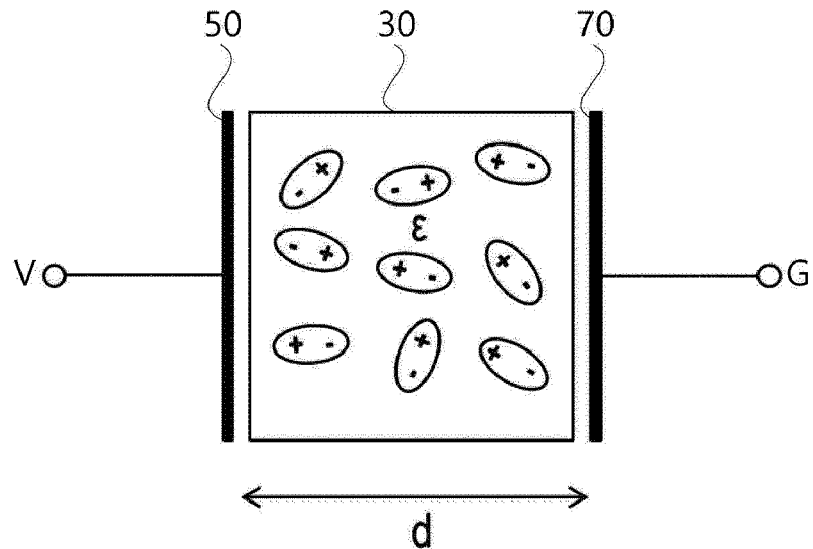
FIGS. 5A and 5B respectively are conceptual diagrams illustrating states before and after a filtering layer constituting the air purifying filter of the present disclosure according to the embodiment is polarized.
Figure 5B:
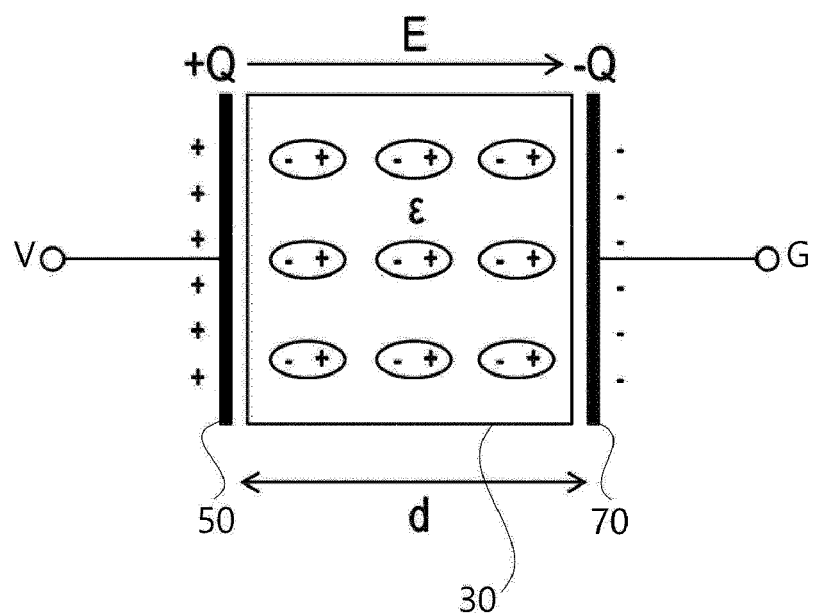

Referring to FIGS. 5(a) and 5(b), a polarization state before power is applied to the air purifying filter 10 of the present disclosure (FIG. 5(a)) and a polarization state after power is applied to the air purifying filter 10 of the present disclosure (FIG. 5(b)) are expressed as conceptual diagrams. As illustrated in the drawing, before power is applied to the air purifying filter 10, more precisely, before the power supply part is connected to the first electrode layer 50 or the second electrode layer 70, the filtering layer 30 which is a dielectric may be maintained to be unpolarized.

However, as illustrated in FIG. 5(b), when an anode (+) is applied to the first electrode layer 50 and a cathode (−) is applied to the second electrode layer 70, the filtering layer 30 is dielectrically polarized. Furthermore, dust particles may be dielectrically polarized by an electric field formed in the filtering layer 30 due to the dielectric polarization. That is, electrically charged dust particles may be subjected to Coulombic force. Accordingly, attraction may be generated between the dust particles and the filtering layer 30 separated therefrom, so the dust particles may be adsorbed on the filtering layer 30. Accordingly, the filtering layer 30 may have a higher collection efficiency for all particle diameters than a filter using a mechanical method.

In this case, when looking at the intensity P of polarization, $P = \varepsilon 0(\varepsilon r-1)E[C/m2],$ $E = V/d[kV/mm].$ ε 0 refers to a dielectric constant in vacuum, ε r refers to a relative dielectric constant, and E refers to electric field strength. That is, the electric field strength may be proportional to a voltage V applied to the filtering layer 30 and inversely proportional to an electrode gap d.

Referring to 5, in a state in which the filtering layer 30, which is a dielectric, is located between the first electrode layer 50 and the second electrode layer 70, when a distance between the first electrode layer 50 and the second electrode layer 70 provided on the opposite sides of the filtering layer 30 increases, the electric field strength may decrease, but in the present disclosure, the filtering layer 30 is made of a very thin material, so the electric field strength is greatly affected by the applied voltage V. Results according to the applied voltage will be described again below.

The filtering layer 30 may have a thin planar structure made of a dielectric material. As a material of the filtering layer 30, a fibrous or particulate dielectric including synthetic organic polymers, natural organic polymers, and inorganic materials may be used. Here, synthetic organic polymers may include polycarbonate, polyester, polyethylene, polyamide, polypropylene, polystyrene, polytetrafluoroethylene, polyvinyl alcohol, and polyvinyl chloride, natural organic polymers may include cellulose, paper (DRY), cotton, and silk, and inorganic materials may include glass, silica, carbon, and alumina. These are only examples, and dielectrics made of various materials may be used as the filtering layer 30.

The first electrode layer 50 laminated on the filtering layer 30 may be configured by interlacing the multiple strands of insulated wires 51 which are laminated on a side of the filtering layer 30 and can receive power. More precisely, the first electrode layer 50 may have a thin planar structure like the filtering layer 30, and may be a kind of fabric material formed by interlacing the multiple strands of insulated wires 51.

Here, the insulated wire 51 may be configured such that a surface thereof is covered and insulated, and an inner core wire thereof is configured as a conductive material. In the embodiment, the insulated wire may be configured as an enameled copper wire. The enameled copper wire refers to a wire insulated in such a manner that insulating enamel is baked and attached on a copper wire to make an insulating film. The insulated wire 51 preferably has a diameter of 0.05 mm to 0.2 mm. This is because the insulated wire 51 has an excessively large resistance when the diameter is less than 0.05 mm, and is thick when the diameter exceeds 0.2 mm, so flexibility of the first electrode layer 50 decreases.

Of course, in addition to an enameled copper wire, various insulated wires may be used as the insulated wires 51. Accordingly, the insulated wires 51 of the embodiment may use ready-made wires that have already been covered and manufactured.

The first electrode layer 50 may be configured (i) by interlacing the multiple strands of insulated wires 51 alone, or (ii) by interlacing the multiple strands of insulated wires 51 and the support lines 53. In the present disclosure, the interlacing means tying multiple materials (the insulated wires 51 or the support lines 53) into multiple strands of materials in lines, arranging the materials side by side, or combining the materials in a way such as weaving, as will be described below.

The support lines 53 may be made of insulating materials, and may be disposed between the insulated wires 51 and may function to maintain the shape of the first electrode layer 50 and reinforce strength thereof. Each of the support lines 53 may have an elongated structure like each of the insulated wires 51, and since the support lines are very thin, the support lines may be interlaced with the insulated wires 51 to make a kind of fabric material.

The support line 53 may be made of a polymer-based material such as polyethylene (PE), polypropylene (PP), and polystyrene (PS), etc., and may be a polyamide material. Of course, the support line 53 may be made of various insulating materials in addition to the materials.

In the embodiment, the first electrode layer 50 may be made to be flexible by interlacing the insulated wires 51 and the support lines 53 such that the insulated wires 51 and the support lines 53 extend in different directions. For example, the first electrode layer 50 may be configured by weaving the insulated wires 51 and the support lines 53. That is, the first electrode layer 50 may be manufactured in a way in which a fabric is made. For example, the first electrode layer 50 may be made by weaving the insulated wires 51 and the support lines 53 such that the insulated wires 51 and the support lines 53 constitute weft and warp yarns, respectively.

Figure 7:
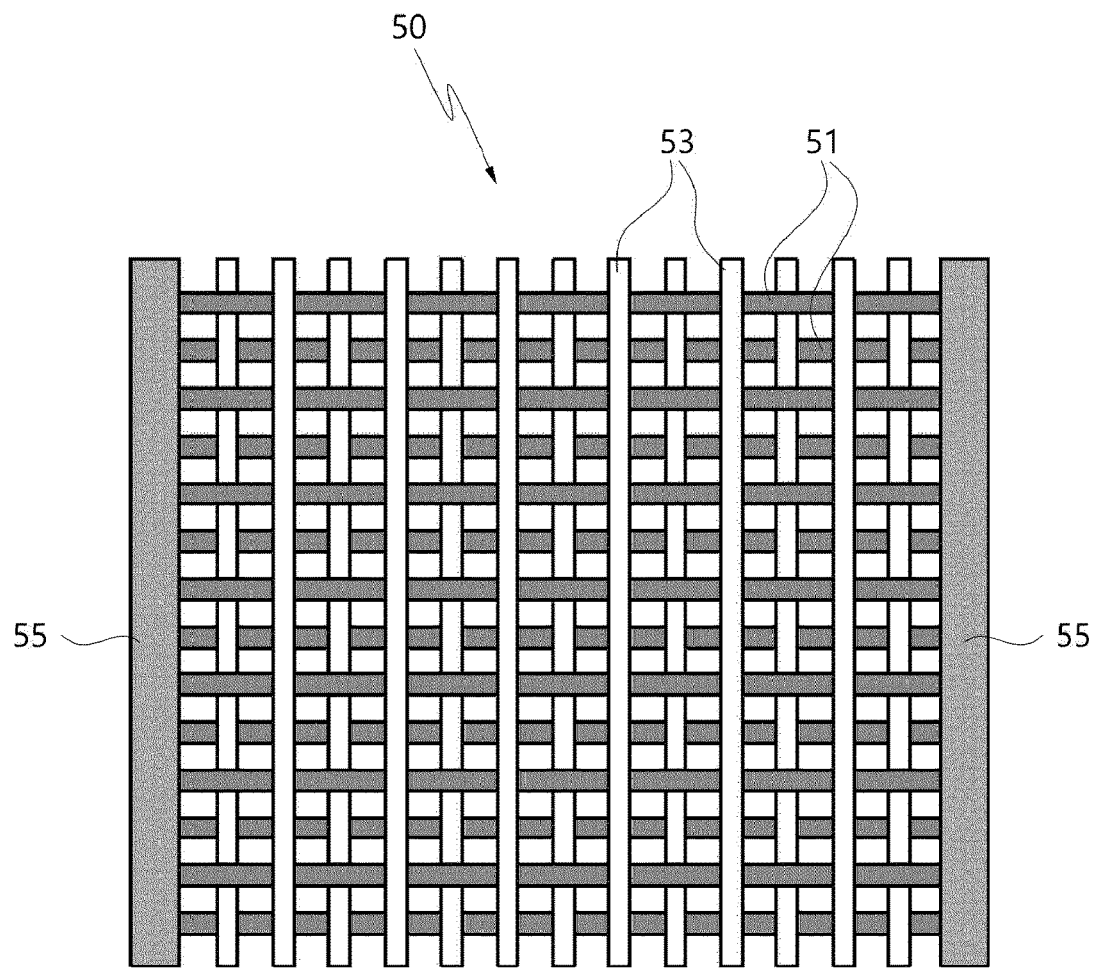
FIG. 7 is a top plan view illustrated by enlarging the configuration of a first electrode layer constituting the air purifying filter of the present disclosure.

Referring to FIG. 7, the first electrode layer 50 is illustrated to be made like one fabric material made by weaving the insulated wires 51 which are weft yarns and the support lines 53 which are warp yarns. Additionally, holes which are empty spaces may be formed between the insulated wires 51 and the support lines 53, and FIG. 7 illustrates a portion of the first electrode layer 50 by enlarging the first electrode layer 50, and these holes may be very small and may be difficult to be seen with the naked eye.

Accordingly, the first electrode layer 50 of the present disclosure may be made by weaving the insulated wires 51 and the support lines 53, and may be rapidly manufactured by using a weaving device, and even a first electrode layer 50 having a large area may be manufactured. As described above, the support lines 53 may be added to the first electrode layer 50, but the first electrode layer 50 may be made by weaving the insulated wires 51 alone.

The first electrode layer 50 may be made like a kind of fabric material when the insulated wires 51 and the support lines 53 are woven together, so as illustrated in FIG. 7, through the regular arrangement of fabrics, the entirety of the electrode layer may be maintained to have a predetermined thickness and be insulated. Furthermore, since the first electrode layer is made by weaving, the first electrode layer 50 may have a very low air pressure differential depending on a location thereof, and may maintain a shape thereof.

Figure 8:
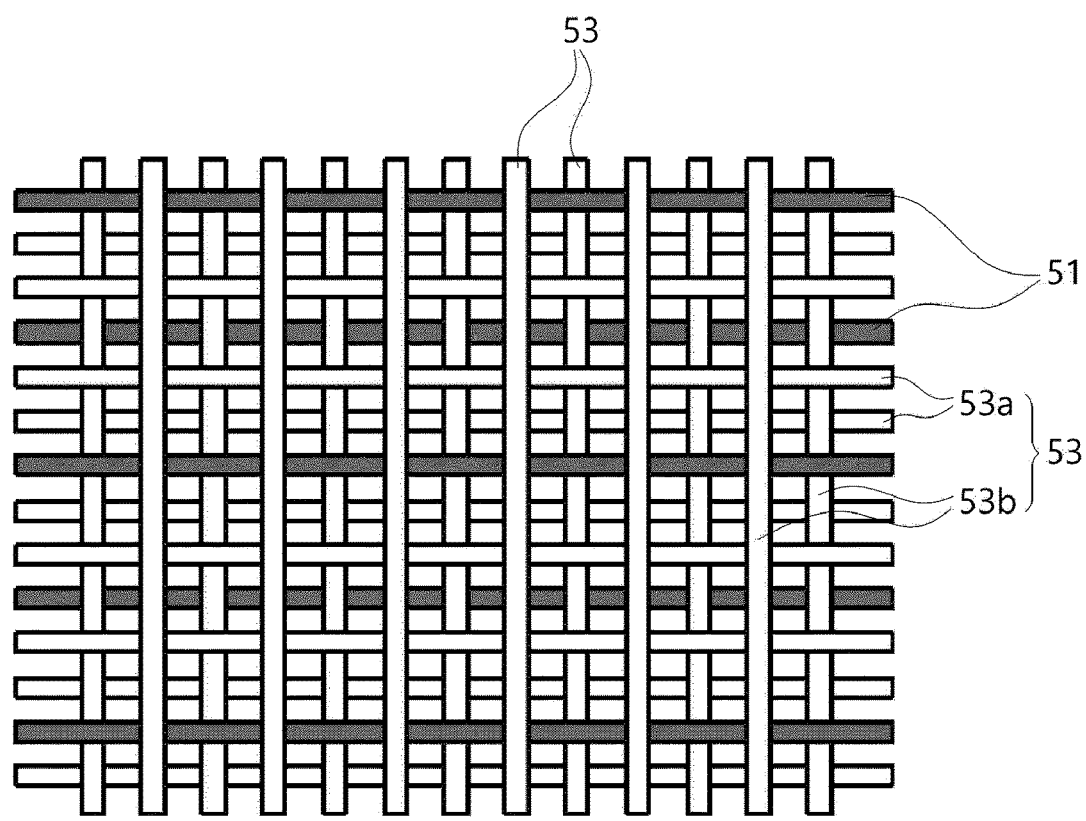
FIG. 8 is a top plan view illustrated by enlarging the first electrode layer constituting the air purifying filter according to the another embodiment of the present disclosure.

Meanwhile, as illustrated in FIG. 7, in the first electrode layer 50, the insulated wires 51 and the support lines 53 may not have similar proportions, but the support lines 53 may constitute weft and warp yarns, and the insulated wires 51 may constitute only a portion of the weft or warp yarns, together with the support lines 53. Referring to FIG. 8, the insulated wires 51 constitute some of the weft yarns, but the support lines 53 constitute most of the weft and warp yarns. In this case, compared to the embodiment of FIG. 7, although an electric field strength generated when power is applied is small, manufacturing costs may be reduced and the strength of the first electrode layer 50 may be increased according to the type of the support lines 53.

In FIGS. 7 and 8, the entire area of the first electrode layer 50 is woven, but alternatively, only a portion of the first electrode layer 50 may be woven, and a remaining part thereof may not be woven or may be finished by bonding or taping.

The first electrode layer 50 woven in this manner may be flexible like a kind of fabric material and each of thin flexible insulated wires 51 may be pre-insulated, so even if the first electrode layer is crumpled, the risk of insulation breakdown thereof may be very low. Accordingly, the air purifying filter 10 including the first electrode layer 50 may be used by being folded into various shapes. For example, as illustrated in FIGS. 1 and 2, the air purifying filter 10 has a folded part V due to pleats, but the filtering layer 30, the first electrode layer 50, and the second electrode layer 70 may be all made of flexible materials, so the air purifying filter 10 may be made in various shapes without the risk of insulation breakdown.

In this case, the first electrode layer 50 may be made in various ways other than weaving. For example, the first electrode layer 50 may be made as a knitted fabric by knitting. Additionally, the first electrode layer 50 may be made by using various processing methods such as a twill weave, a satin weave, a double weave, a doup weave, and a fancy weave. Furthermore, the first electrode layer 50 having a planar structure may be made in such a manner that the multiple strands of insulated wires 51 and the support lines 53 are mixed with each other such that the multiple strands of insulated wires 51 and the support lines 53 extend in parallel to each other, and opposite edges thereof or four corners thereof are fixed.

Meanwhile, as illustrated in FIG. 3, a conductive member 55 may be connected to the first electrode layer 50. The conductive member 55 may be considered as a kind of terminal for applying external power to the first electrode layer 50, and may be connected to each of the opposite end parts of the first electrode layer 50, or only to any one end part thereof as illustrated in FIG. 3.

The conductive member 55 may be made of a thin plate-shaped conductive material, and may be connected to the edge of the first electrode layer 50. Accordingly, the conductive member 55 may be connected to an end of each of multiple insulated wires 51 constituting the first electrode layer 50 in a direction crossing the end so as to allow current to flow to the multiple insulated wires 51. Accordingly, when power of the power supply part is applied to the conductive member 55, the conductive member 55 may transmit power simultaneously to the multiple strands of insulated wires 51.

The conductive member 55 may be made of a conductive material, and for example, may be made of thin sheets of stainless steel, aluminum, and copper, etc., or may be configured as a conductive tape. Furthermore, the conductive member 55 may be coupled to the insulated wires 51 by welding or conductive paste. Additionally, the conductive member 55 may be insulated except for parts connected to the power supply part and the insulated wires 51.

The conductive member 55 may include a pair of conductive members and may be connected to the first electrode layer 50 and the second electrode layer 70, respectively. In this case, terminal parts (not shown) for supplying power may protrude from the pair of conductive members 55, respectively, in opposite directions to each other. For example, a terminal part for supplying power to the first electrode layer 50 may protrude upward, and a terminal part for supplying power of opposite polarity to or for grounding the second electrode layer 70 may protrude downward. In this case, the two terminal parts may be spaced apart from each other so as to further improve insulation of the filter, and in the process of inserting the filter 10 into the air purifier, the connection of the terminal parts may be naturally performed. Meanwhile, as illustrated in FIG. 8, the conductive member 55 may be omitted, and in this case, an end part of the first electrode layer 50 may be directly connected to a separate busbar.

As illustrated in FIGS. 3 and 4, the second electrode layer 70 may be laminated on a side of the filtering layer 30 opposite to the side of the first electrode layer, and, together with the first electrode layer 50, may create electrostatic induction in the filtering layer 30. The second electrode layer 70, like the first electrode layer 50, may be made of a thin flexible material like a fabric material, and may include a conductive material to form an electric field.

A polarity opposite to the polarity of the first electrode layer 50 may be applied to the second electrode layer 70 from the power supply part, or the second electrode layer 70 may be grounded without being connected to the power supply part. For example, an anode (+) may be applied to the first electrode layer 50, and a cathode (−) may be applied to the second electrode layer 70, or the second electrode layer 70 may be grounded.

The surface of the second electrode layer 70 may be insulated like the first electrode layer 50, and a core wire thereof may be made to be flexible in such a manner that an insulated wire 51 which is electrically conductive and a support line 53 which is an insulator are interlaced together in different directions from each other. As described above, the second electrode layer 70 may be manufactured by weaving.

Alternatively, in the embodiment, the second electrode layer 70 is made of a fabric material containing a conductive material. For example, the second electrode layer 70 may be a fabric material whose surface is coated with carbon. As illustrated in FIGS. 3 and 4, in the embodiment, carbon coating may be performed on the surface of the second electrode layer 70, so the second electrode layer 70 may be conductive. Of course, although the second electrode layer is not as conductive as the first electrode layer 50 composed of the insulated wires 51, the second electrode layer may have conductivity sufficient to polarize the filtering layer 30 located between the first electrode layer 50 and the second electrode layer. The second electrode layer 70 may be coated with metal instead of carbon. In the embodiment, the second electrode layer 70 is made by coating the surface of a non-woven base material with carbon.

Figure 6:
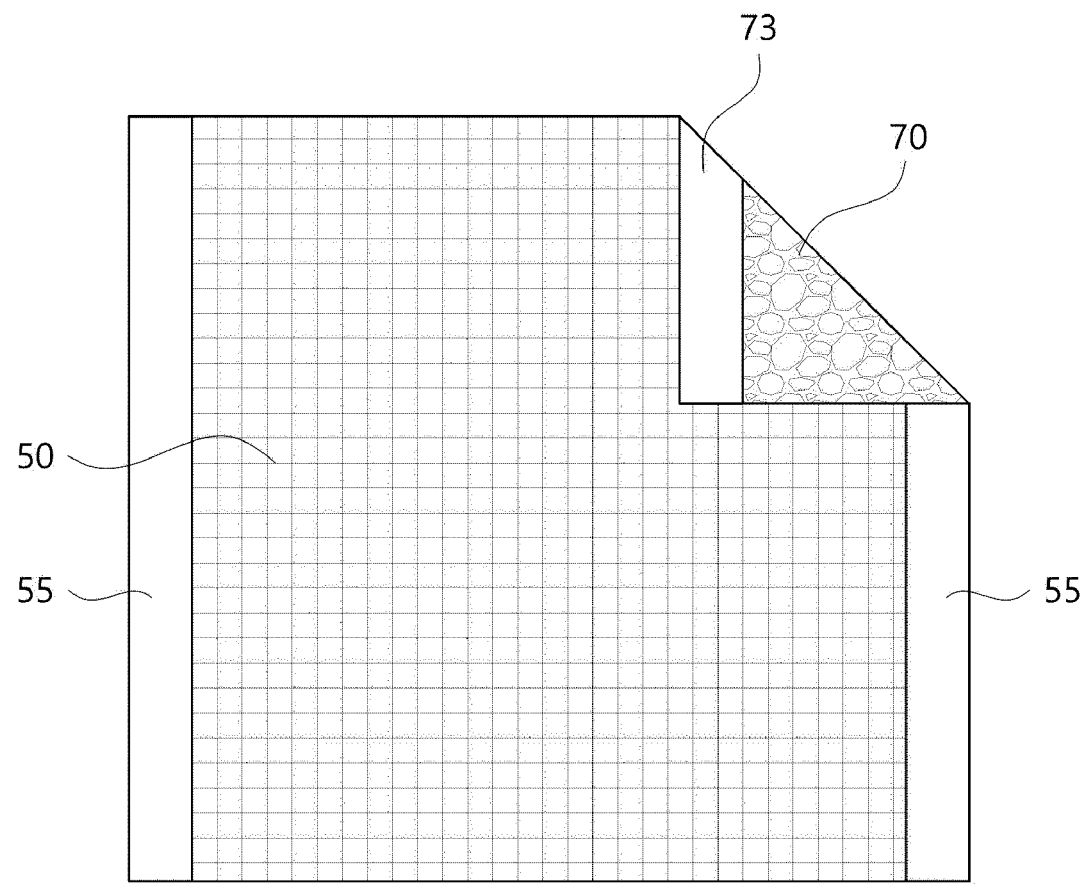
FIG. 6 is a top plan view illustrating another embodiment of the air purifying filter of the present disclosure.

Referring to FIG. 6, an insulated section 73 in which a conductive material is omitted may be formed on the edge of the second electrode layer 70. Such an insulated section 73, which is a section having no conductive material, may be considered, for example, as a part of the second electrode layer 70 in which carbon coating is omitted. Such an insulated section 73 may be an insulation distance between the pair of electrode layers. Accordingly, the air purifying filter of the present disclosure may have the insulated section 73 without a need for an additional insulation work, so insulation may be securely realized between the pair of electrode layers.

The end part of each of the insulated wires 51 constituting the first electrode layer 50 may be exposed to the outside without being coated, and may be in contact with the second electrode layer 70, and thus current may flow therebetween. When the current flows therebetween, insulation breakdown may occur between the first electrode layer 50 and the second electrode layer 70, and thus there is a possibility that the filtering layer 30 is no longer polarized. Accordingly, this possibility may be reduced by such an insulated section 73. The insulated section 73 may extend along the edge of each of the upper and lower surfaces of the second electrode layer 70 adjacent to the first electrode layer 50. Of course, the insulated section 73 may be formed even on the first electrode layer 50 or may be formed only on the first electrode layer 50.

Although not shown, the first electrode layer 50 and the second electrode layer 70 may have lengths different from each other, with the filtering layer 30 placed therebetween, so a step may be made between the first electrode layer 50 and the second electrode layer 70. Such a step may function to increase the insulation performance of the filter by spacing neighboring end parts of the first electrode layer 50 and the second electrode layer 70 apart from each other.

Figure 9:
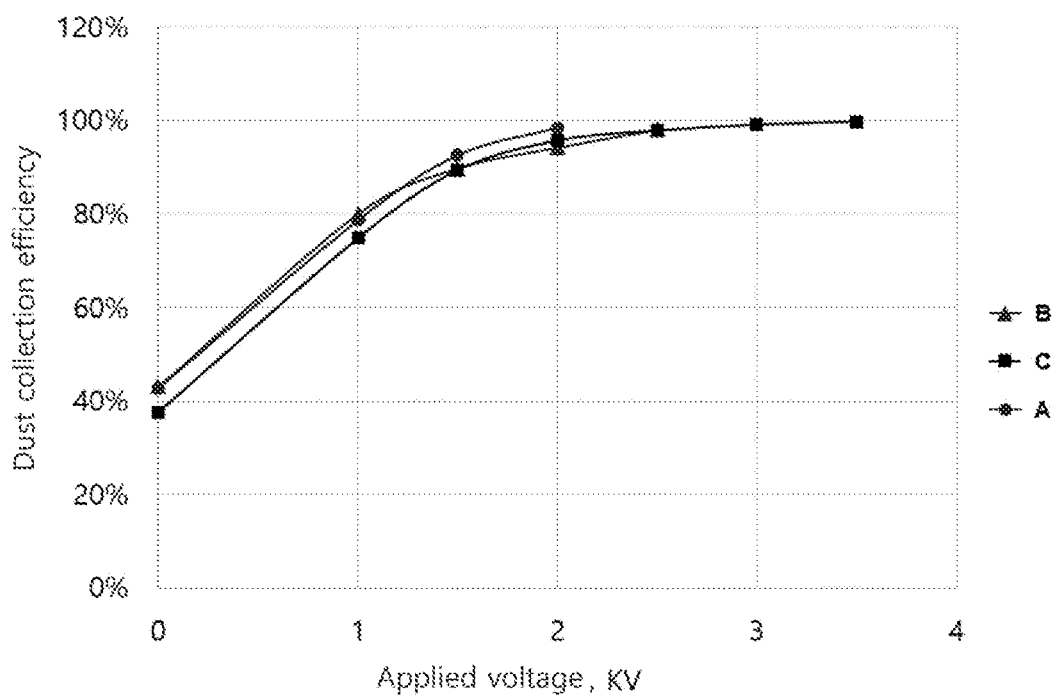
FIG. 9 is a graph illustrating dust collection efficiency when different voltages are applied to the air purifying filter of the present disclosure.

Referring to FIG. 9, a relationship between a voltage applied to the air purifying filter 10 and dust collection efficiency thereof is illustrated. As illustrated in FIG. 9, when a voltage of 1.5 kV or more is applied to the first electrode layer 50 constituting the air purifying filter 10, the air purifying filter is seen to obtain dust collection efficiency close to 100%. That is, according to the present disclosure, the high dust collection efficiency of the filter may be obtained by applying a relatively high voltage to the first electrode layer.

In this case, in the graph, A~C are the results of testing while varying the content of carbon coated on the second electrode layer 70, and the carbon content is in the order of A>B>C. As illustrated in the graph, in a case of A having a highest carbon content, insulation breakdown occurs first when an applied voltage is close to 2 kV, and in a case of C, when an applied voltage is 3.5 kV, insulation breakdown occurs. Accordingly, it is preferable that a voltage of about 1.5 kV to 2 kV is applied to the filter 10 of the present disclosure regardless of the carbon content.

In the above, all the components according to the embodiments of the present disclosure are described as being coupled to each other as one or being operated in the coupled state, but the present disclosure is not necessarily limited to the embodiments. That is, if it is within the scope of the present disclosure, at least one of all the components may be selectively combined and operated. In addition, the terms such as "include", "compose", or "have" as described above means that the corresponding components can be inherent unless specifically stated to the contrary. Accordingly, it should be interpreted that other components are not excluded, but may further be included. All terms, including technical or scientific terms, have the same meaning as generally understood by those skilled in the art to which the present disclosure belongs, unless otherwise defined. Commonly used terms, such as predefined terms, should be interpreted as being consistent with the contextual meaning of the related art, and are not to be interpreted as ideal or excessively formal meanings unless explicitly defined in the present disclosure.

The above description is only to illustrate the technical idea of the present invention, but those skilled in the art to which the present invention pertains will be able to make various modifications and variations without departing from the essential characteristics of the present invention. Accordingly, the embodiments disclosed in the present invention is not intended to limit the technical spirit of the present invention, but to explain it, and the scope of the technical spirit of the present invention is not limited to the embodiments. The scope of protection of the present invention should be interpreted by the scope of the claims below, and all technical spirits within the scope equivalent thereto should be interpreted as being included in the scope of the claims of the present invention.

The invention claimed is:

1. An air purifying filter comprising:
    a filtering layer configured as a dielectric to collect particles;
    a first electrode layer laminated on a first side of the filtering layer, and including a plurality of insulated wires to receive power; and
    a second electrode layer laminated on a second side of the filtering layer opposite to the first side of the filtering layer, and including a conductive material to receive a polarity opposite to a polarity of the first electrode layer,
    wherein one of the first electrode layer and the second electrode layer includes an insulated section in which a conductive material is omitted, wherein the insulated section extends along an edge of each of upper and lower surfaces of the second electrode layer.

2. The air purifying filter of claim 1, wherein the first electrode layer includes a plurality of support lines that are insulators, and the first electrode layer is configured by interlacing the plurality of insulated wires and the plurality of support lines.

3. The air purifying filter of claim 1, wherein a surface of the first electrode layer is insulated, and a core wire thereof is made to be flexible such that an insulated wire, which is electrically conductive, and a support line, which is an insulator, are interlaced together to extend in different directions from each other.

4. The air purifying filter of claim 1, wherein the first electrode layer is configured by weaving the insulated wires and a plurality of support lines.

5. The air purifying filter of claim 4, wherein the insulated wires and the support lines are weaved to form the first electrode layer such that the insulated wires constitute weft yarns and the support lines constitute warp yarns.

6. The air purifying filter of claim 4, wherein the insulated wires and the support lines are weaved to form the first electrode layer such that the insulated wires constitute a portion of weft yarns or warp yarns, and the support lines constitute a portion of weft yarns or warp yarns.

7. The air purifying filter of claim 1, wherein the insulated wires extend in parallel in a first direction, and support lines extend in parallel in a second direction different from the first direction.

8. The air purifying filter of claim 1, wherein the first electrode layer is a knitted fabric configured by knitting the plurality of insulated wires and a plurality of support lines.

9. The air purifying filter of claim 1, wherein the second electrode layer includes an insulated surface, and a core wire thereof is made to be flexible such that an insulated wire and a support line are interlaced together in different directions, wherein the second electrode layer is to receive a polarity opposite to a polarity of the first electrode layer.

10. The air purifying filter of claim 1, wherein the second electrode layer is a fabric material containing a conductive material.

11. The air purifying filter of claim 10, wherein the second electrode layer is a fabric material having a surface coated with carbon or metal.

12. The air purifying filter of claim 1, wherein a length of the first electrode layer is different from a length of the second electrode layer, and the filtering layer is provided between the first electrode layer and the second electrode layer such that a step is provided between the first electrode layer and the second electrode layer.

13. The air purifying filter of claim 1, wherein a conductive member is connected to an edge of the first electrode layer, and the conductive member is connected to an end of each of the insulated wires constituting the first electrode layer so as to allow current to flow to the insulated wires.

14. The air purifying filter of claim 13, wherein the first electrode layer includes a first pair of conductive members and the second electrode layer includes a second pair of conductive members, wherein a first terminal protrudes from the first pair of conductive members in a first direction, and a second terminal protrudes from the second pair of conductive members in a second direction opposite to the first direction.

15. An air purifying filter comprising:
a filtering layer configured as a dielectric to collect particles;
first and second electrode layers laminated on opposite sides of the filtering layer, respectively, the first electrode layer including an insulated wire to receive power, and a support line which is an insulator; and
a power supply device configured to supply power to one of the first and second electrode layers such that polarization is generated through an electric field in the filtering layer disposed between the first electrode layer and the second electrode layer,
wherein one of the first electrode layer and the second electrode layer includes an insulated section in which a conductive material is omitted, wherein the insulated section extends along an edge of each of upper and lower surfaces of the second electrode layer.

16. The air purifying filter of claim 15, wherein the first electrode layer is configured by weaving the insulated wire and the support line.

17. The air purifying filter of claim 15, wherein the first electrode layer is configured by weaving the insulated wire and the support line such that the insulated wire and the support line constitute a weft yarn and a warp yarn, respectively.

18. The air purifying filter of claim 17, wherein the second electrode layer is configured as a fabric material having a surface coated with carbon or metal.

19. The air purifying filter of claim 1, wherein the insulated wires extend in parallel in a first direction, the support lines extend in parallel in a second direction parallel to the first direction.

* * * * *